United States Patent [19]
Yahara

[11] Patent Number: 5,173,731
[45] Date of Patent: Dec. 22, 1992

[54] RECORDING APPARATUS

[75] Inventor: Masashi Yahara, Yokohama, Japan

[73] Assignee: Canon Kabushiki Kaisha, Tokyo, Japan

[21] Appl. No.: 882,250

[22] Filed: May 8, 1992

Related U.S. Application Data

[63] Continuation of Ser. No. 711,133, Jun. 6, 1991, abandoned.

[30] Foreign Application Priority Data

Jun. 8, 1990 [JP] Japan .................................. 2-148783

[51] Int. Cl.⁵ .............................................. G03B 27/52
[52] U.S. Cl. ..................................... 355/40; 354/105; 355/64
[58] Field of Search ................... 355/39, 40, 50, 64; 354/105

[56] References Cited

U.S. PATENT DOCUMENTS

| | | | |
|---|---|---|---|
| 3,987,467 | 10/1976 | Cowles | 354/105 |
| 4,134,105 | 1/1979 | Stadler | 354/105 |
| 4,198,157 | 4/1980 | Johnson | 355/40 |
| 4,444,490 | 4/1984 | Stark et al. | 355/40 |
| 4,519,701 | 5/1985 | Kanaoka et al. | 355/39 |
| 4,553,833 | 11/1985 | Kanaoka et al. | 355/40 |
| 4,701,046 | 10/1987 | Shiga | 355/39 |
| 4,849,809 | 7/1989 | Tahara et al. | 355/40 X |

*Primary Examiner*—Richard A. Wintercorn
*Attorney, Agent, or Firm*—Fitzpatrick, Cella, Harper & Scinto

[57] ABSTRACT

The present invention provides a recording apparatus comprising an image recording means for recording image information on a recording medium, a code recording means for photographing inherent code information on the recording medium, a memory means for previously storing a number of code information, a registering means for previously registering the code informations in correspondence to corresponding switches, and a recording means for recording the code information registered in the registering means when the corresponding switch is depressed.

9 Claims, 4 Drawing Sheets

RECORDING APPARATUS

This application is a continuation of application Ser. No. 07/711,133 filed Jun. 6, 1991 abandoned.

BACKGROUND OF THE INVENTION

1. Field of the Invention

The present invention relates to a recording apparatus for successively recording image information, for example, on an elongated microfilm.

2. Related Background Art

In the past, as a typical example of recording apparatuses of this kind, a rotary camera has been proposed. Now, the rotary camera will be described hereinbelow.

The rotary camera is a kind of automatic photographing apparatus wherein the material such as bill, check, share certificate, document, drawing and the like to be stored in a microfilm is fed to a photographing position, image information printed on the material being fed is successively photographed on a microfilm being fed, and the material after photographed is ejected out of the apparatus.

Among such photographing apparatuses, there is an apparatus wherein code information (retrieval data) such as figures, characters and the like can also be photographed on the microfilm, independently of the image information, so as to easily retrieve the data after the microfilm is developed. Such code information includes characters, symbols and the like which serve to indicate data or other contents of the images for each group of images.

By the way, in the above-mentioned conventional examples, in view of the constraints in the cost, there is an apparatus having no function for indicating the code information to be photographed or an apparatus wherein the code information could be indicated only by the symbols. In such apparatuses, in order to know the contents of the code information registered in operation switches arranged on a keyboard for commanding the photograph of the code information, it is necessary to depress the switch for photographing the code information on the recording medium and then to develop the recording medium for visualizing the code information on the recording medium. Is the particular instance when there are a plurality of switches corresponding to the code information, it is troublesome to handle the apparatus.

SUMMARY OF THE INVENTION

In view of the above-mentioned conventional drawbacks, an object of the present invention is to provide a recording apparatus wherein the registered contents of code information can be ascertained only by a simple key operation.

In order to achieve the above object, the present invention provides a recording apparatus comprising an image recording means for recording image information on a recording medium, a code recording means for photographing inherent code information on the recording medium, a memory means for previously storing a number of code information, a registering means for previously registering the code information in correspondence to corresponding switches, and a recording means for recording the code information registered in the registering means when the corresponding switch is depressed.

In the recording apparatus having the above-mentioned arrangement, it is possible to collectively record the contents of the code information registered in the plural switches partially or wholly by manipulating the specific switch and to ascertain the code information stored in each switch without any specific displaying or indicating means.

DETAILED DESCRIPTION OF THE PREFERRED EMBODIMENTS

The present invention will now be explained with reference to the accompanying drawings in connection with a rotary camera embodying the invention.

Figure 1:
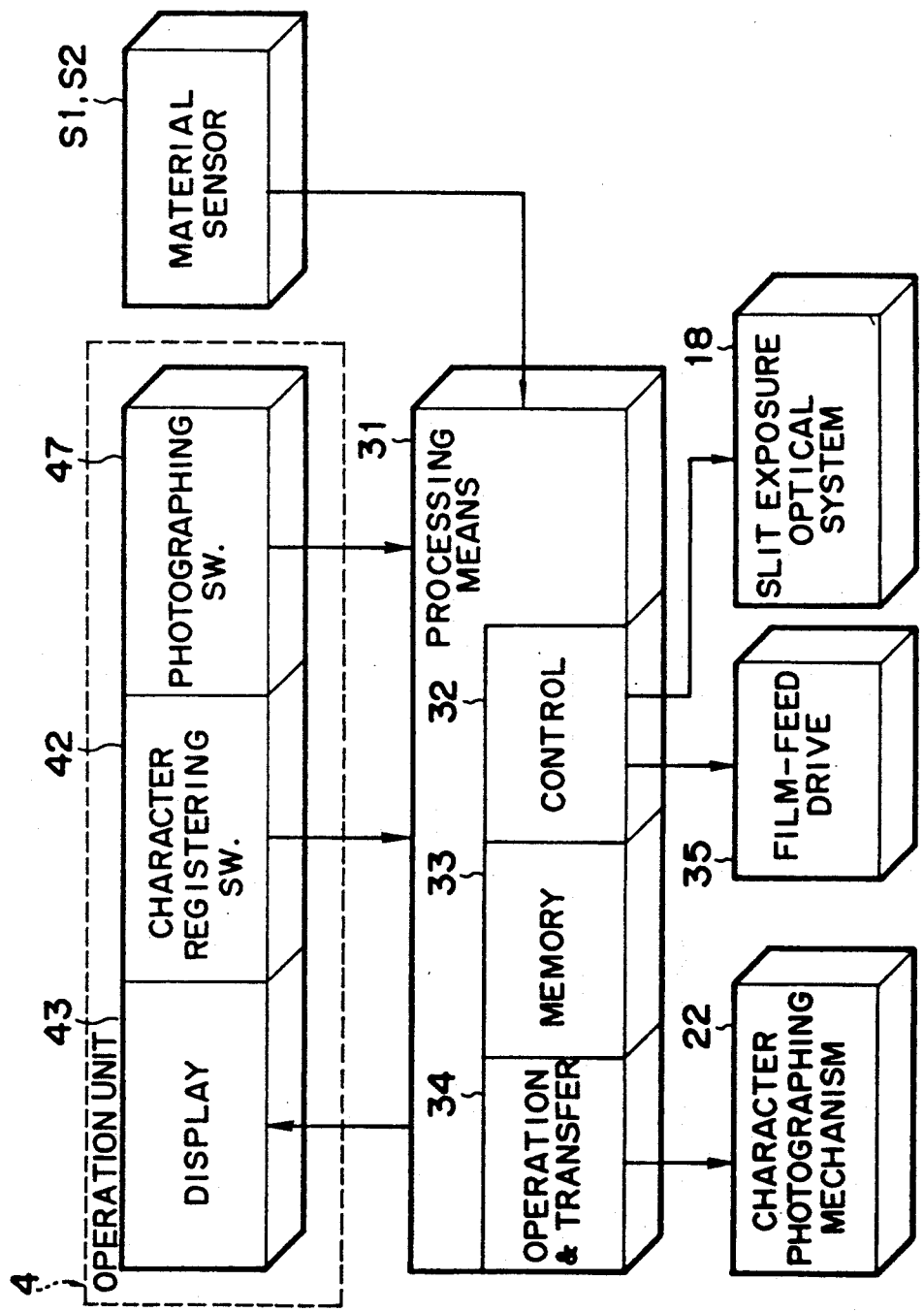
FIG. 1 is a control block diagram of a recording apparatus according to a preferred embodiment of the present invention.
Figure 2:
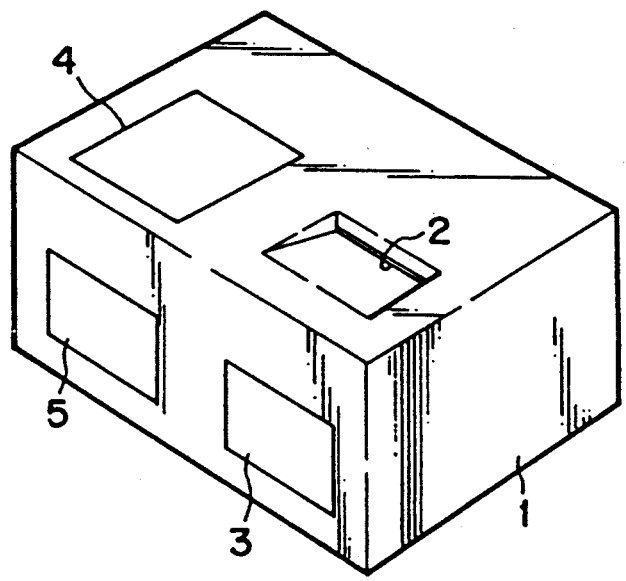
FIG. 2 is a perspective view of the recording apparatus.
Figure 3:
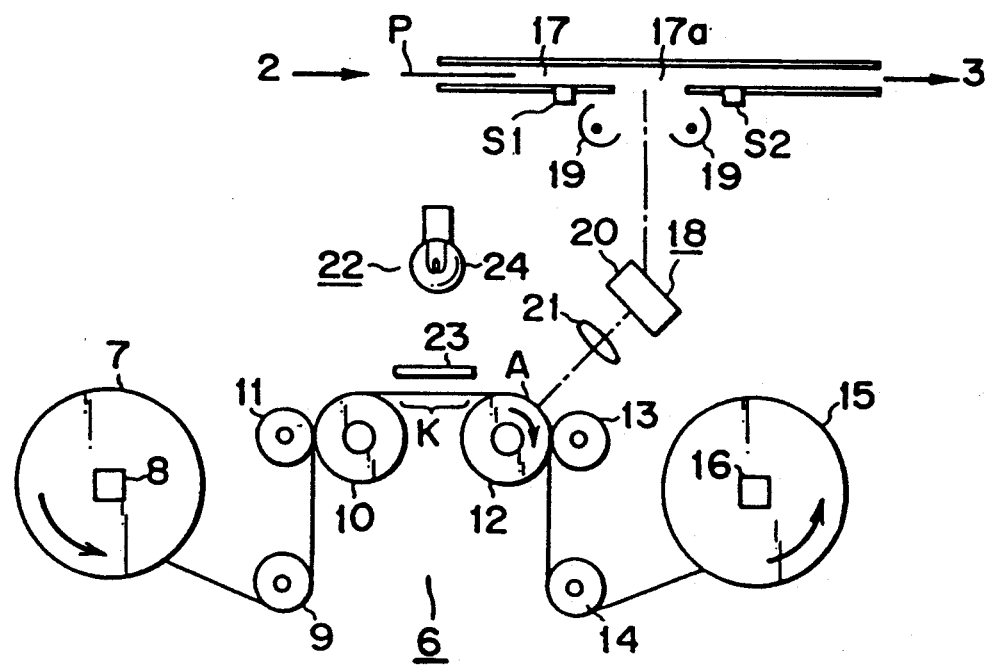
FIG. 3 is a schematic sectional view showing an internal construction of the recording apparatus.
Figure 4:
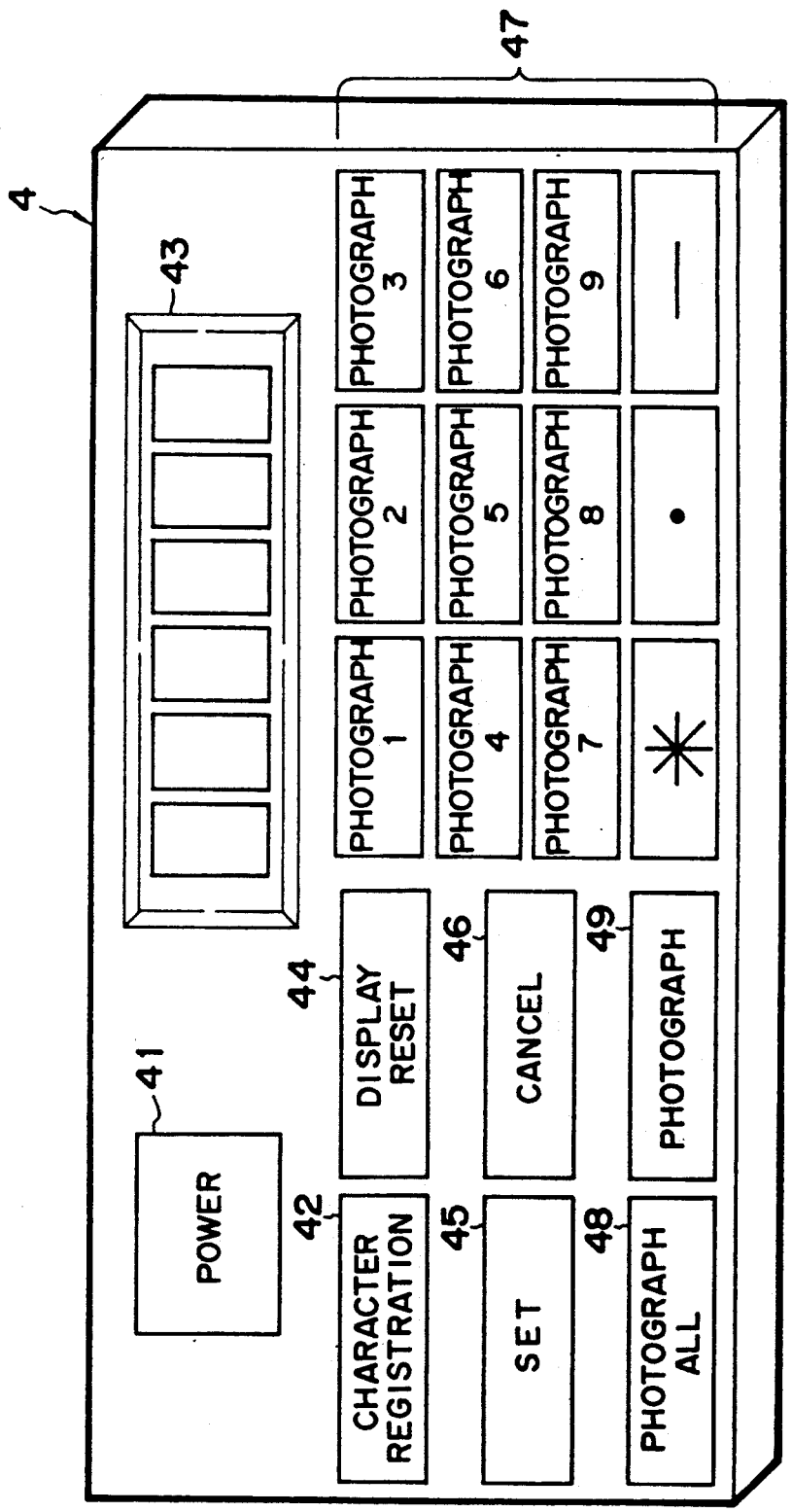
FIG. 4 is a plan view showing a key arrangement in an operation portion of the recording apparatus.

FIG. 1 is a block diagram of a camera control system, FIG. 2 is a perspective view of the camera, FIG. 3 is a schematic sectional view of a photographing mechanism of the camera, and FIG. 4 is a plan view showing a key arrangement in an operation portion of the camera.

In FIG. 2, the rotary camera comprises a housing 1, an inlet 2 for the material (object) to be photographed, an ejection exit 3 for ejecting the material after it is photographed, a photograph treating control portion (operation portion) 4, and a door 5. When the door 5 is opened, a film (recording medium) can be mounted on or dismounted from a photographing mechanism 6 (FIG. 3) disposed within the camera.

The photographing mechanism 6 shown in FIG. 3 includes a film supply reel 7 freely rotatably mounted on a shaft 8 and around which an elongated non-exposed film F is wound, and a film take-up reel 15 supported on a shaft 16 and rotatingly driven in a direction shown by the arrow by rotating the shaft 16 by means of a drive mechanism (not shown). Between the film supply reel 7 and the film take-up reel 15, along a film feeding path, there are disposed a first guide roller 9, a second guide roller 10, a pinch roller 11 urged against the second guide roller, capstan roller (film winding roller) 12, a pinch roller 13 urged against the capstan roller, and a third guide roller 14. By a manual operation or an auto-loading operation, the film F can be set by passing a leading end of the film F (unwound from the reel 7) around the rollers 9-14 and anchoring the leading end to a core (not shown) of the take-up reel 15.

A material feeding path 17 for passing the material P from the inlet 2 to the ejection exit 3 is provided with a photographing slit 17a. On both sides of the photographing slit 17a, there are disposed a first sensor S1 for detecting the fact that a leading end of the material P reaches a position slightly ahead of the slit 17a, and a second sensor S2 for detecting the fact that a trailing end of the material P has passed through the slit 17a. A slit exposure optical system 18 acting as an image photographing means is disposed between the slit 17a and the capstan roller 12, which optical system comprises a pair of illumination lamps 19, a mirror 20 and a focusing lens 21 and which serves to slit-expose an image of the material P passed through the slit 17a onto the film on the capstan roller 12 at an exposure position A.

A character photographing mechanism (code information photographing means) 22 is arranged above the film portion K tensioned between the second guide roller 10 and the capstan roller 12 and comprises a liquid crystal plate (display) 23 of permeable type for displaying a character, and an illumination lamp 24 for illuminating the liquid crystal plate. The character photographing mechanism 22 serves to photograph the code information such as character, figure, date, symbol and the like on the Film F.

In the key arrangement in the operation portion 4 shown in FIG. 4, there are provided a power switch 41, a character registration switch 42, a display portion 43 for displaying the number of photographs, a display reset switch 44, a set switch 45 and cancel switch 46 for registering the code information, photograph switches (first commanding member) 47 (photograph 1 ~ photograph 9) in which the code information is registered and which serve to command the photograph of the code information a photograph all switch (second commanding member) 48 for commanding the photograph mechanism to photograph all of the code information registered in the switches 47 collectively, a partial, photograph switch (second commanding member) 49 for commanding the photograph mechanics to photograph a portion of the code information registered in the switches 47 collectively.

The following Table 1 shows an example of the code information registered in each photograph switch 47.

TABLE 1

| Switch No. | Code Information 1 | Code Information 2 |
|---|---|---|
| Photograph 1 | MA START | |
| Photograph 2 | MB START | 13579 |
| Photograph 3 | MC START | 001-298 |
| Photograph 4 | FILM STOP | 25-1 |
| . | . | . |
| . | . | . |
| . | . | . |

Figure 5:
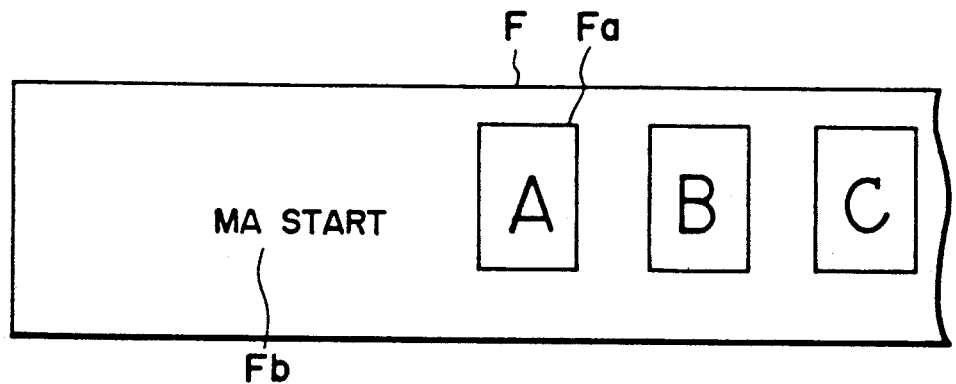
FIG. 5 to 7 are plan views showing examples of films on which code information is photographed.

For example, when the switch regarding the photograph 1 is depressed, the character "MA START" as the code information 1 registered in this switch is photographed on the film F by the character photographing mechanism 22. FIG. 5 shows an example of a film on which the character (code information) has been photographed. In this example, Fa denotes image information photographed on the film, and Fb denotes the code information photographed on the film.

Next, the control block diagram shown in FIG. 1 will be explained. A processing means 31 comprising a microprocessor and the like serves to perform the processing operation on the basis of the input commands from the switches S1, S2 and the operation portion 4. The processing means 31 includes a control portion 32 for controlling a film-feed drive portion 35 and the slit-exposure optical system 18, a memory portion 33 having a memory means for previously storing a number of code information and a registering means for previously registering the code informations in correspondence to the corresponding switches, and an operation transfer portion 34 for searching the code information to be photographed from the memory portion 33 and for transferring the code information to the character photographing mechanism 22.

Figure 6:
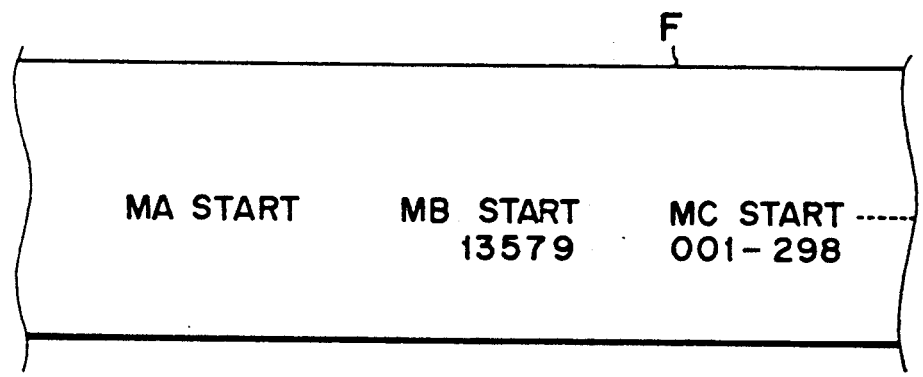

Incidentally, in the illustrated embodiment, since the operation portion 4 includes the display portion 43 having a one-line, six-unit display as shown in FIG. 4, an operator cannot ascertain the code informations registered in the switches regarding the photographes 1 ~ 9 at a glance. Thus, when the photograph all switch 48 is depressed, all of the code information from one registered in the switch 47 regarding the photograph 1 to one registered in the switch 47 regarding the photograph 9 are successively photographed on the film F. By developing this film F, it is possible to correctly know the code information registered in the switches 47 regarding the photographes 1 ~ 9 from the developed film F. FIG. 6 shows an example of a film so photographed and developed.

In the illustrated embodiment, while the characters are photographed along the length of the film F, the characters may be photographed along the width of the film when only the confirmation of the registered code information is desired, and, the consumption amount of the film can be reduced by decreasing a space or distance between character groups.

Next, the partial photograph switch 49 for selectively photographing only the portion of the code informations registered in the switches regarding the photographes 1 ~ 9 will be explained. For example, when the switches 47 regarding the photographes 1, 3 and 4 are selected and then the partial photograph switch 49 is depressed, only the code information registered in the selected switches are successively photographed. Thus, by using this partial photograph switch 49, it is possible to ascertain the part of the registered code information.

Figure 7:
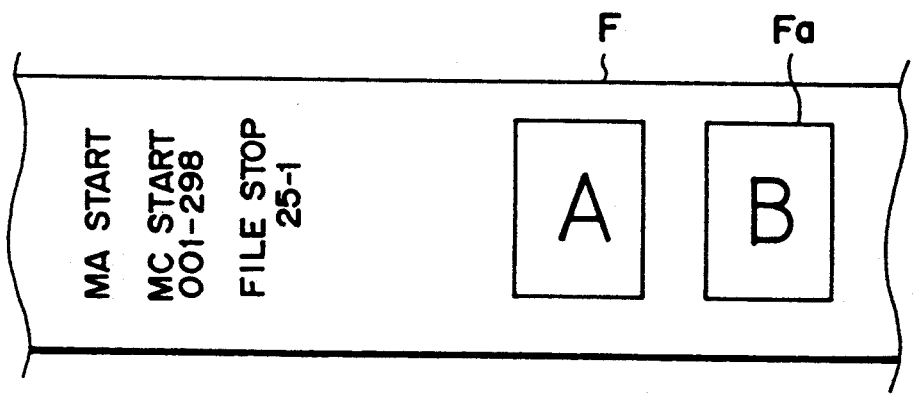

Incidentally, even when the code information registered in the switches 47 regarding the photographes 1, 3 and 4 are desired to be photographed on the film F successively, the partial photograph switch 49 can be used. FIG. 7 shows an example of a film on which the part of the code informations is so photographed.

Now, it is apparent that, when all of the switches 47 regarding the photographes 1 ~ 9 are selected and then the partial photograph switch 49 is depressed, the function same as that obtained by the photograph all switch 48 can be achieved. Accordingly, the photograph all switch 48 is not necessarily provided independently, but, the function same as that obtained by the photograph all switch 48 may be achieved by special key operations.

The function obtainable from the photograph all switch is not necessarily limited to photograph the contents registered in the switches 47, but may include the collective photographing of the contents of the code information stored in the memory portion 33 of the apparatus.

As mentioned above, according to the present invention, in a recording apparatus wherein the code information are previously registered in correspondence to the respective switches and the code information can be recorded on the recording medium upon depression of the corresponding switch, by providing the function capable of collectively photographing the part or the whole of the code information registered in the plural switches, it is possible to ascertain the registered contents by simple key operations, without any display means capable of displaying all of the code information registered in the switches at a time. Further, since the code information registered in the plural switches can be recorded collectively, it is possible to reduce the recording area on the recording medium.

In the illustrated embodiment, while the image and/or code information were photographed on the film while moving the material and the film, the image and/or code information may be photographed while keeping the material and the film stationary.

I claim:

1. An image recording apparatus comprising:
   an image recording means for recording an image on a recording medium;
   a memory means for storing a plurality of code information;
   first commanding members provided in correspondence to the respective code information and operated by plural manual operations commanding to record the corresponding code information on said recording medium;
   a code information recording means for recording the code information corresponding to said first commanding member on said recording medium; and
   second commanding members operated by a manual operation commanding to record the code informations corresponding to the part or whole of said first commanding members.

2. An image recording apparatus according to claim 1, where said first and second commanding members comprise switches.

3. An image recording apparatus according to claim 1, wherein said recording medium comprises a microfilm.

4. An image recording apparatus according to claim 3, wherein said image recording means comprises an optical means for projecting an image of an object onto said microfilm.

5. An image recording apparatus according to claim 4, wherein said code information recording means comprises a display for displaying the code information, and the code information displayed on said display is photographed on said microfilm.

6. An image recording apparatus comprising:
   recording means for recording an image of an original onto a recording medium;
   memory means for storing a quantity of retrieval data to be recorded on the recording medium;
   first command means for commanding a start of recording the retrieval data selected among the retrieval data stored in the memory means;
   data recording means for recording on the recording means the retrieval data stored on the memory means;
   first control means for controlling the data recording means to record the retrieval data selected in accordance with a command from the first command means;
   second command means for commanding a start of recording the retrieval data; and
   second control means for controlling the data recording means to record a quantity of the retrieval data commanded by the first command means in accordance with a command from the second command means.

7. An image recording apparatus according to claim 6, wherein said first command means comprises a plurality of operation switches in correspondence with the retrieval data stored in the memory means.

8. An image recording apparatus according to claim 6, wherein the recording medium is a microfilm, and wherein the recording means exposes an image of the original onto the microfilm while conveying the microfilm and the original.

9. An image recording apparatus according to claim 8, wherein the data recording means comprises a display for displaying the retrieval data, and wherein the retrieval data displayed on the display is exposed in the microfilm.

* * * * *

UNITED STATES PATENT AND TRADEMARK OFFICE
CERTIFICATE OF CORRECTION

PATENT NO. : 5,173,731
DATED : December 22, 1992
INVENTOR(S) : MASASHI YAHARA

It is certified that error appears in the above-indentified patent and that said Letters Patent is hereby corrected as shown below:

TITLE PAGE

AT [57] - ABSTRACT:

Line 8, "informations" should read --information--.

COLUMN 3:

Line 30, "mechanics" should read --mechanism--;
   Line 65, "informations" should read
--information--.

COLUMN 4:

Line 6, "informations" should read --information--;
   Line 27, "tions" should read --tion--;
   Line 40, "informations" should read
--information--.

UNITED STATES PATENT AND TRADEMARK OFFICE
CERTIFICATE OF CORRECTION

PATENT NO. : 5,173,731
DATED : December 22, 1992
INVENTOR(S) : MASASHI YAHARA

Page 2 of 2

It is certified that error appears in the above-indentified patent and that said Letters Patent is hereby corrected as shown below:

COLUMN 5:

Line 25, "tions" should read --tion--.

Signed and Sealed this

Fourteenth Day of December, 1993

BRUCE LEHMAN

Attest:

Attesting Officer

Commissioner of Patents and Trademarks